United States Patent
Sun

(10) Patent No.: US 6,898,236 B1
(45) Date of Patent: May 24, 2005

(54) SYSTEM AND METHOD FOR ADAPTIVELY ACCOMMODATING A HIGH AMPLITUDE DOWNSTREAM SIGNAL IN A DSL MODEM

(75) Inventor: Ting Sun, Houston, TX (US)

(73) Assignee: 2Wire, Inc., San Jose, CA (US)

( * ) Notice: Subject to any disclaimer, the term of this patent is extended or adjusted under 35 U.S.C. 154(b) by 840 days.

(21) Appl. No.: 09/670,490

(22) Filed: Sep. 26, 2000

(51) Int. Cl.[7] .............................................. H04B 1/38
(52) U.S. Cl. ....................................... 375/222
(58) Field of Search ........................... 375/222, 220, 375/259, 269, 345; 327/270, 308, 393; 330/82, 84, 54, 144, 284, 282

(56) References Cited

U.S. PATENT DOCUMENTS

| | | | |
|---|---|---|---|
| 6,212,227 B1 * | 4/2001 | Ko et al. .................... | 375/222 |
| 6,351,509 B1 * | 2/2002 | Vitenberg et al. ........... | 375/377 |
| 6,556,635 B1 * | 4/2003 | Dehghan .................... | 375/345 |
| 6,621,346 B1 * | 9/2003 | Nabicht et al. ............. | 330/284 |

OTHER PUBLICATIONS

STLC60134S; TOSCA Integrated ADSL CMOS Analog Front–End Circuit; Aug. 1999.

* cited by examiner

*Primary Examiner*—Khai Tran
(74) *Attorney, Agent, or Firm*—Blakely, Sokoloff, Taylor & Zafman LLP

(57) ABSTRACT

A system and method are disclosed for adaptively accommodating a high amplitude downstream signal in a DSL modem. High amplitude downstream signals are common with local loop lengths of less than about 6,000 feet and can saturate DSL modem components and impair DSL service if not effectively accommodated.

In general, a DSL system detects a high amplitude downstream DSL signal and adjusts a DSL modem analog front end in response to the detected high amplitude downstream DSL signal so that analog front end components of a DSL modem are not saturated by the high amplitude downstream DSL signal. Pursuant to one embodiment, a digital signal processor detects the high amplitude DSL signal and, in response, decreases a gain of a first stage receiver to accommodate the high amplitude downstream DSL signal. Another embodiment introduces additional attenuation of the downstream DSL signal to attenuate high amplitude downstream DSL signals before they enter first stage receiver amplifier circuits.

4 Claims, 11 Drawing Sheets

SYSTEM AND METHOD FOR ADAPTIVELY ACCOMMODATING A HIGH AMPLITUDE DOWNSTREAM SIGNAL IN A DSL MODEM

BACKGROUND

1. Technical Field

This disclosure relates generally to DSL modems and, more particularly, to an adaptively adjustable DSL modem for operation with loops of different lengths.

2. Description of the Background Art

As the Internet continues to become more popular, there is an increasing need for reliably accessing and navigating ("surfing") the Internet at high speed and at low cost. Providing high speed Internet access permits users to send and receive information over the Internet quickly and reduces the time the user must wait to receive requested information. In addition, there is a continuous pressure to lower the cost of accessing the Internet and Internet-related devices.

One method of accessing the Internet is by using Digital Subscriber Line (DSL) technology. Various versions of DSL exist, such as Asymmetric DSL (ADSL), Symmetric DSL (SDSL), Rate Adaptive DSL (RADSL), Very high speed ADSL (VADSL), Consumer DSL (CDSL), High bit rate DSL (HDSL), etc., and may be collectively referred to as DSL.

ADSL is one version of DSL technology that expands the useable bandwidth of existing copper telephone lines, delivering high-speed data communications at rates up to about 8 Mbps without interrupting normal telephone service, also known as POTS (Plain Old Telephone Service). To achieve this end, ADSL uses frequency-division multiplexing (FDM) technology to carry POTS and ADSL channels all on the same twisted-pair copper telephone line.

A variant of ADSL known as DSL-Lite or G.lite is a DMT-based technology that typically uses about one half of the bandwidth of full-rate ADSL or G.DMT. One advantage of the DSL-Lite-technology is that it has been designed for easy, low-cost deployment and removes the need for a voice-data splitter at every user site.

In one configuration, an ADSL circuit connects an ADSL modem on each end of a twisted copper pair telephone line, creating three information channels. The three channels include a high-speed downstream channel, a medium speed duplex channel, and a POTS (Plain Old Telephone Service) channel. The POTS channel is typically split off from the ADSL modem by filters, thus permitting continuous POTS service, even if the ADSL fails. To create these multiple channels, ADSL modems divide the available bandwidth of a telephone line and typically assign a 4 kHz region for POTS at the DC end of the band.

ADSL is a point-to-point connection technology in that an ADSL termination device, such as an ADSL modem, must be present on each end of the copper circuit. Since ADSL works over copper, it is an appropriate technology for the "local loop," which comprises the copper circuits running from a central office into virtually every home and business. Conventionally, ADSL service generally requires a local loop length of about 6,000–14,000 feet for optimal service. Indeed, ADSL signals are attenuated as they pass over the loop. Hence, the longer the local loop, the more attenuated the ADSL signal will be upon arriving at the ADSL modem from a central office. While some ADSL service is possible with loop lengths greater than 14,000 feet, it has been found that with loops much longer than about 14,000 feet, the ADSL signal is too attenuated to provide high data transfer rates.

Conversely, for local loop lengths less than about 6,000 feet, the ADSL signal is not sufficiently attenuated for conventional ADSL modems. In particular, conventional ADSL modems typically comprise a fixed high-gain receiver for amplifying and increasing the resolution of the downstream, or incoming, ADSL signal to accommodate ADSL signals that have been attenuated by passing over the local loop. Typically, the first stage receiver of a conventional ADSL modem will have a fixed gain of about 3× to 6×. Consequently, if, due to a relatively short loop length, the ADSL signal is relatively strong when it arrives at the CPE ADSL modem, the strong ADSL signal tends to saturate the first stage receiver and cause distortion, which in turn will cause noise and impair the data connection rate.

Accordingly, a need exists for a DSL modem that may efficiently operate under a variety of loop lengths, including loop lengths of less than about 6,000 feet. An additional need exists to provide a DSL modem that may operate in short loop conditions without having the first stage receiver be saturated by the downstream DSL signal. Moreover, a need exists to provide a system and method by which a DSL modem may accommodate high amplitude downstream DSL signals without significantly impairing the DSL data connection rate.

SUMMARY

The present system and method overcome or substantially alleviate prior problems associated with operating a DSL modem in connection with a short (i.e. less than about 6,000 feet) DSL loop by adaptively adjusting the DSL modem in response to the amplitude of the downstream signal.

In one embodiment, a system and method are provided for decreasing the gain of the first stage receiver of a DSL modem in response to receiving a relatively strong downstream DSL signal. Pursuant to this embodiment, the DSL modem first stage receiver includes a switching device to switch in additional resistance to reduce the gain of the receiver in response to a strong DSL downstream signal. As mentioned above, a strong downstream signal may result from a local loop having a length less than about 6,000 feet.

According to another embodiment, a system and method are provided for attenuating the downstream DSL signal before it enters first stage receiver amplifier circuits. In this embodiment, a loss circuit is disposed between a DSL modem hybrid and the first stage receiver. In its default position, the loss circuit provides little attenuation of the incoming, or downstream signal. When a strong downstream signal is detected, however, the loss circuit switches into a configuration that provides additional attenuation to the strong downstream signal so that the strong downstream signal does not saturate the first stage receiver of the ADSL modem.

Accordingly, one embodiment of the present method includes detecting the magnitude of the downstream DSL signal and decreasing the gain of the first stage receiver. Another embodiment of the present method includes switching in additional resistance in response to detection of a strong DSL signal to attenuate the downstream DSL signal before it enters the DSL modem first stage receiver.

A DSL modem according to the present system and method, therefore, may operate effectively in connection with loop lengths less than about 6,000 feet even though the amplitude of the downstream signal may be higher than that of a downstream signal that has been transmitted over a longer loop. As such, the present DSL modem may be used with local loops of lengths greater than or less than about 6,000 feet and is, consequently, more versatile.

Other advantages and features will be apparent from the drawings and detailed description as set forth below.

DETAILED DESCRIPTION

Figure 1:
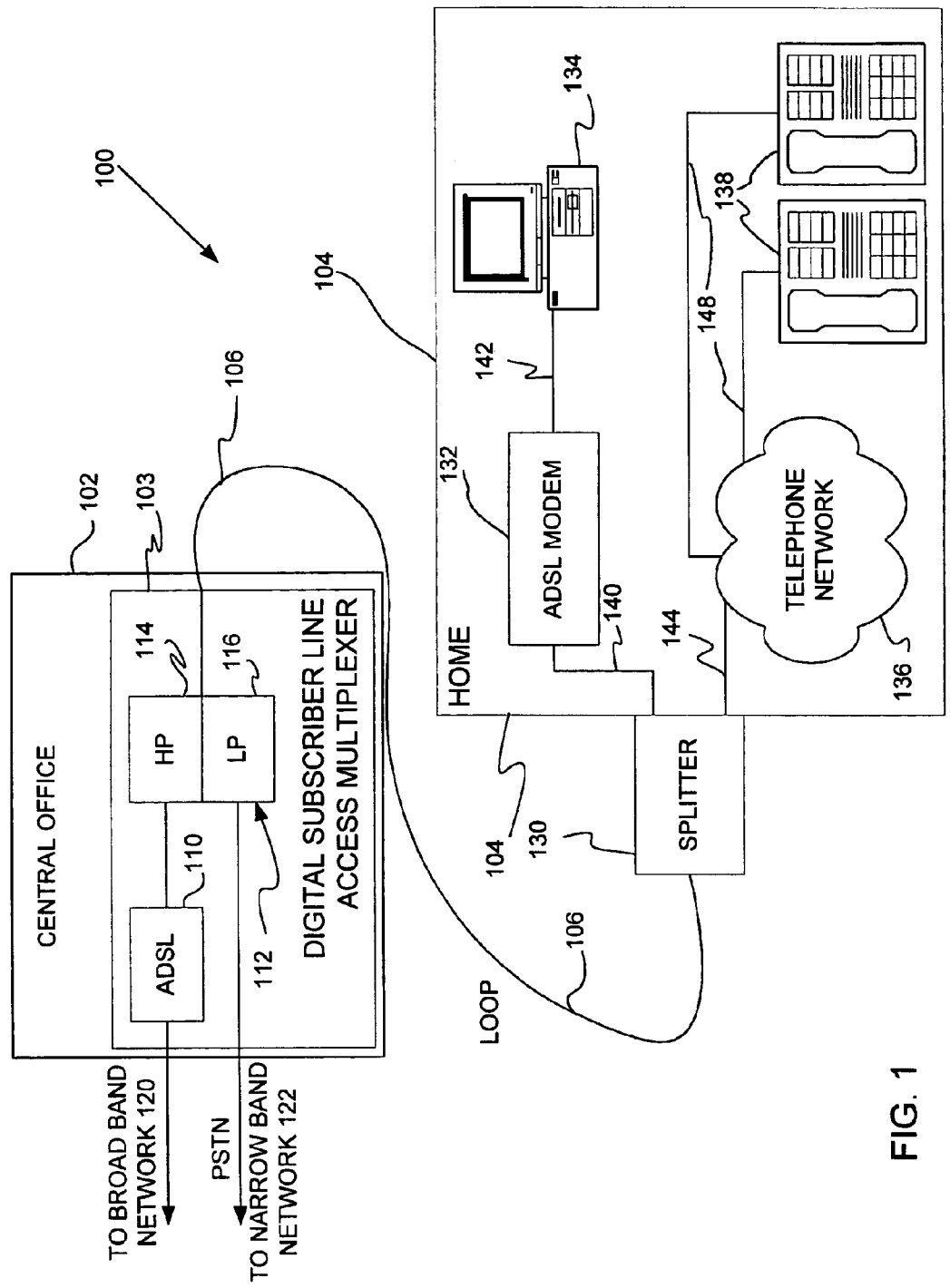
FIG. 1 is a block diagram illustrating an ADSL service network.

FIG. 1 illustrates an ADSL service network 100 that includes a central office 102 including a Digital Subscriber Line Access Muliplexer (DSLAM) 103 and a home 104 coupled by a loop 106. As shown, the central office 102 includes an ADSL modem 110 and a loop interface 112. The loop interface 112 includes a high pass filter 114 and a low pass filter 116 to split high frequency ADSL components of the loop signal and the lower frequency POTS (Plain Old Telephone Service) components of the loop signal. In this configuration, the high pass filter 114 passes signals in the ADSL frequency range to the broadband network 120 via the ADSL modem 110. Likewise, the low pass filter 116 passes the lower frequency POTS signals to the narrow band network 122 over a PSTN (Public Switched Telephone Network) line.

The home 104 is shown as including a splitter 130, an ADSL modem 132, a computer 134, a telephone, or POTS, network 136, and POTS devices, such as telephones 138. While the ADSL modem 132 is illustrated as being disposed outside of the computer 134, those skilled in the art will appreciate that the ADSL modem 132 could also be positioned inside the computer 134.

The splitter 130 splits the incoming signal into high and low frequency components. As discussed in more detail below with reference to FIG. 2, the splitter 130 routes the high frequency component along line 140 to the ADSL modem 132, which is coupled to a network device, such as a computer 134, by a line 142. Likewise, the splitter 130 routes the low frequency, or POTS, component of the incoming signal to the telephone network 136 along line 144. The telephones 138, as well as other POTS devices (e.g. 56 k modems, facsimile machines, etc.), are coupled to the telephone network 136 by lines 148.

Additional details concerning conventional ADSL equipment are found in Standards Project for Interfaces Relating to Carrier to Customer Connection of Asymmetrical Digital Subscriber Line (ADSL) Equipment, T1E1.4/97-007R6, T1.413 Issue 2, edited by John Bingham and Frank van der Putten, dated Sep. 26, 1997, which is incorporated herein by reference.

Figure 2:
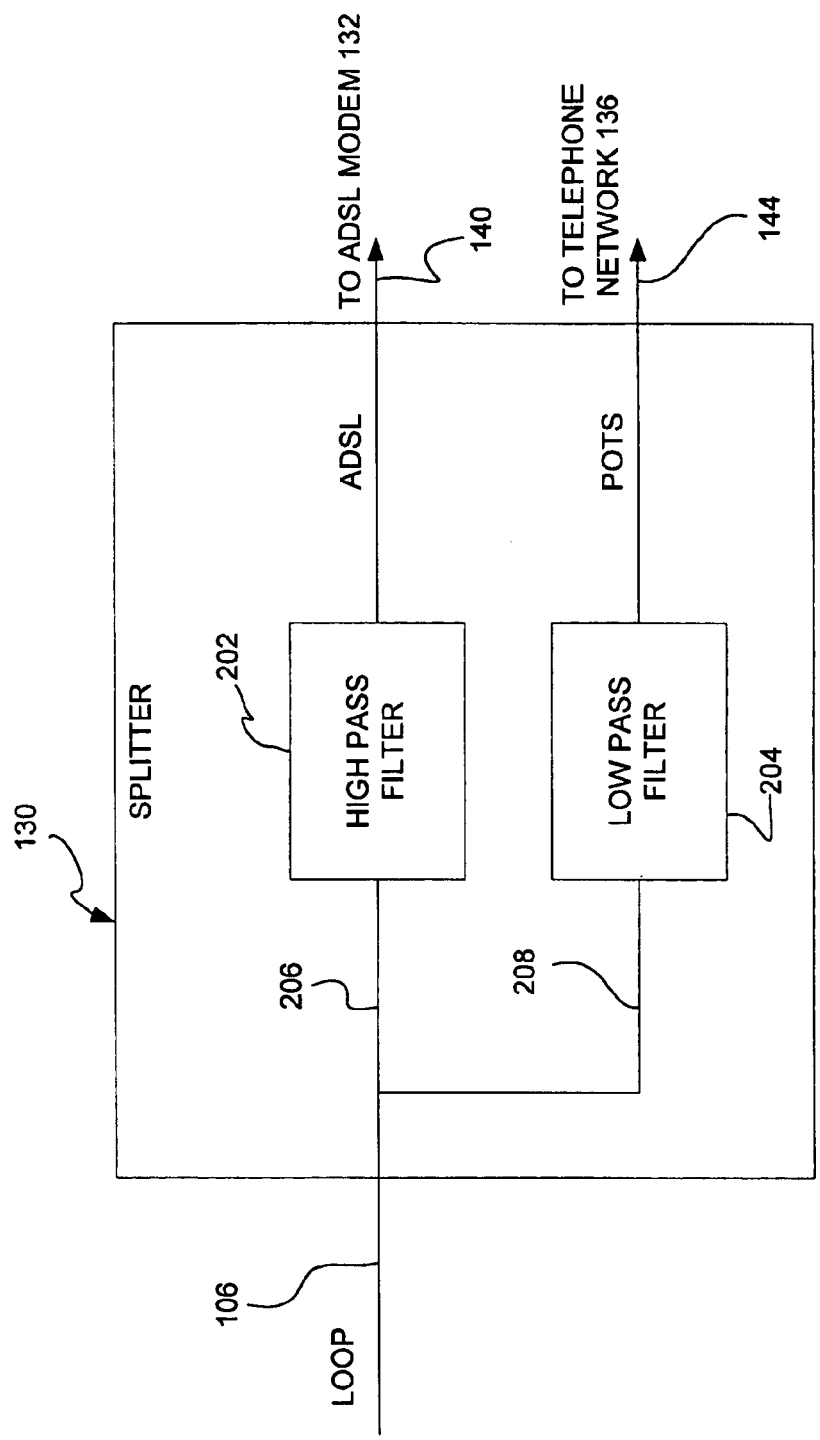
FIG. 2 is a block diagram of the splitter of FIG. 1.

FIG. 2 illustrates details of the splitter 130 of FIG. 1. As shown, the splitter 130 includes a high pass filter 202 and a low pass filter 204 coupled to the loop 106 via lines 206 and 208 respectively. The high pass filter 202 permits higher frequency signals, such as ADSL signals, to pass from the loop 106 to the ADSL modem 132 (FIG. 1) while preventing the lower frequency POTS signals from entering onto the line 140 and potentially interfering with the operation of the ADSL modem 132. Similarly, the low pass filter 204 permits the lower frequency POTS signals to pass onto the telephone network 136 while preventing higher frequency signals, such as ADSL signals, from entering onto the telephone network 136 and potentially interfering with the operation of POTS devices, such as the telephones 138, coupled thereto.

Figure 3:
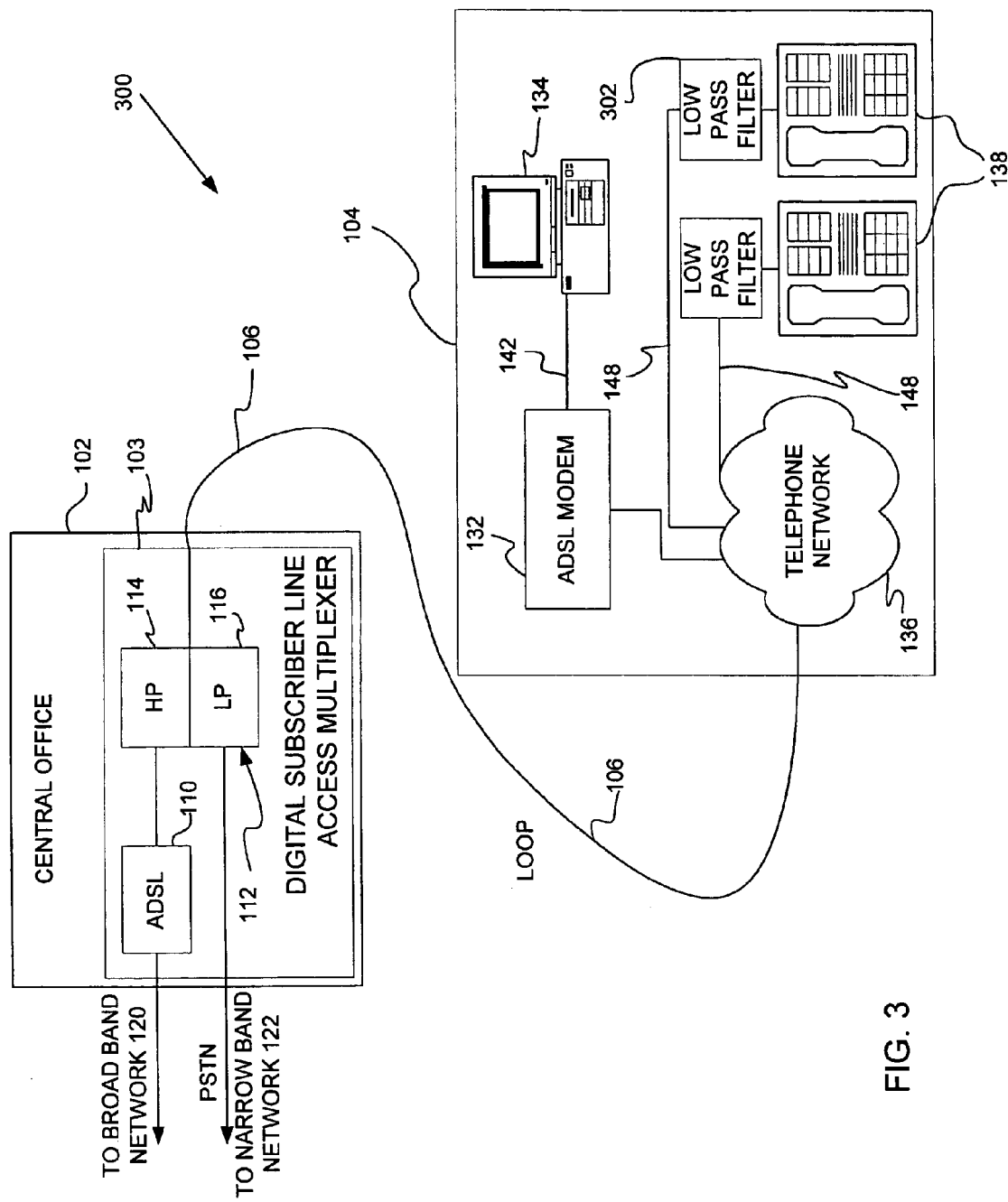
FIG. 3 is a block diagram illustrating an alternative ADSL service network.

FIG. 3 illustrates an alternative ADSL network 300. The network 300 differs from that illustrated in FIG. 1 in that it does not include the splitter 130 disposed between the loop 106 and the telephone network 136 or the ADSL modem 132. As such, the loop 106 is directly coupled to the telephone network 136. In contrast with the network 100 shown in FIG. 1, the network 300 includes low pass filters 302 disposed between the telephones 138 and the telephone network 136. The low pass filters 302 generally prevent the higher frequency signals, such as ADSL signals, from interfering with operation of the telephone 138 and separate the lower frequency voice band signals from the ADSL spectrum.

Figure 4:
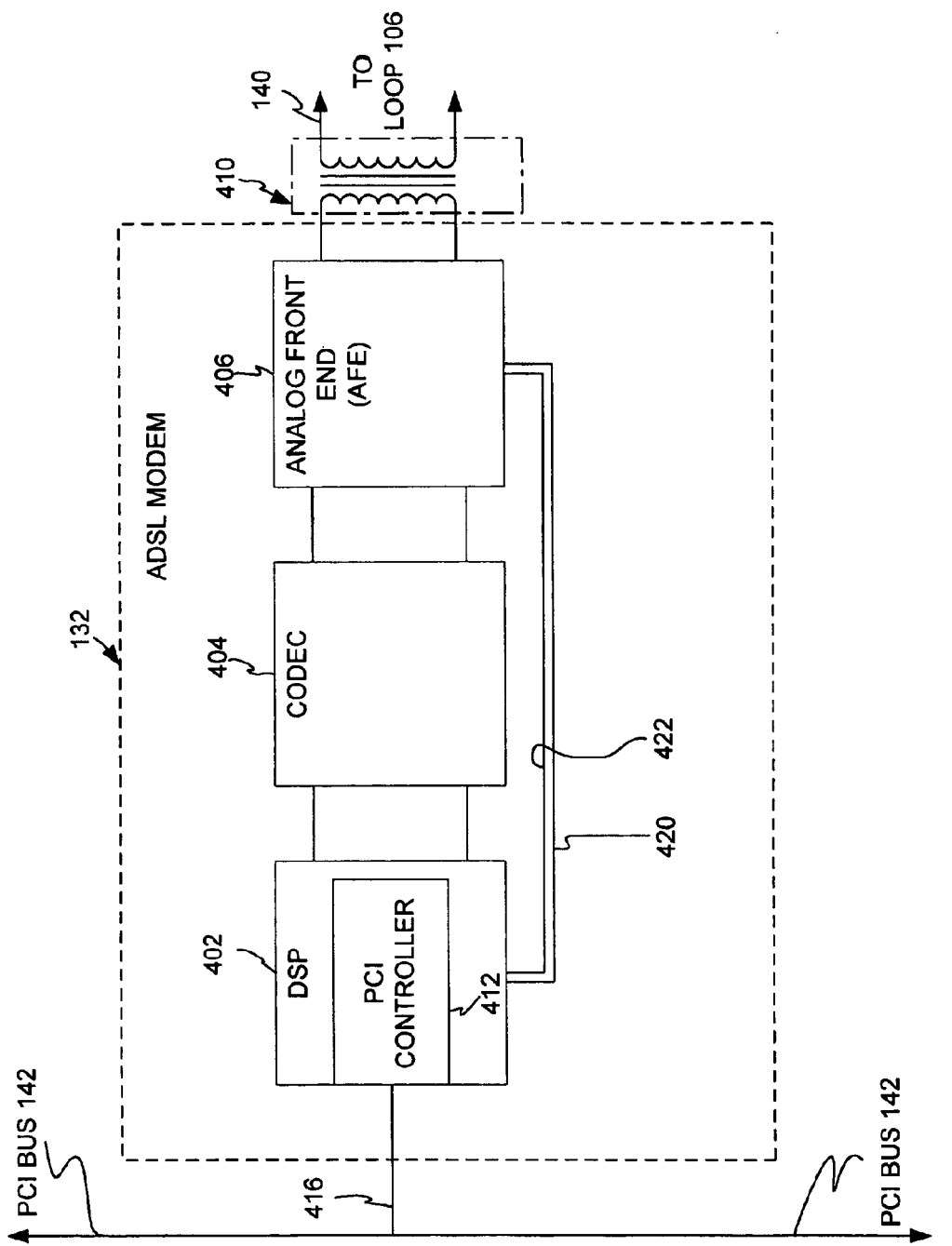
FIG. 4 is a block diagram of the ADSL modem illustrated in FIGS. 1 and 3.

FIG. 4 illustrates details of the ADSL modem 132 depicted in FIGS. 1 and 3. As shown, the ADSL modem 132 includes a Digital Signal Processor (DSP) 402, an ADSL codec 404, and an Analog Front End (AFE) 406. The AFE 406 is coupled to the line 140, which leads to the loop 106 by a transformer 410. The DSP 402 is illustrated as including a PCI (Peripheral Component Interconnect) bus controller 412, which controls communications between the ADSL modem 132 and the PCI bus 142 of the computer 134 (FIG. 1) along line 416. Again, those skilled in the art will appreciate that the ADSL modem 132 can be positioned internal or external of the computer 134 and the data peripheral interface 142 between the computer 134 and the associated ADSL modem 132 can be, for example, USP or parallel port. First and second control lines 420 and 422 interconnect the AFE 406 and the DSP 402 to enable direct communication therebetween. As those skilled in the art will appreciate, the DSP 402 is a CPU, or data processor, used for digital signal processing.

Figure 5:
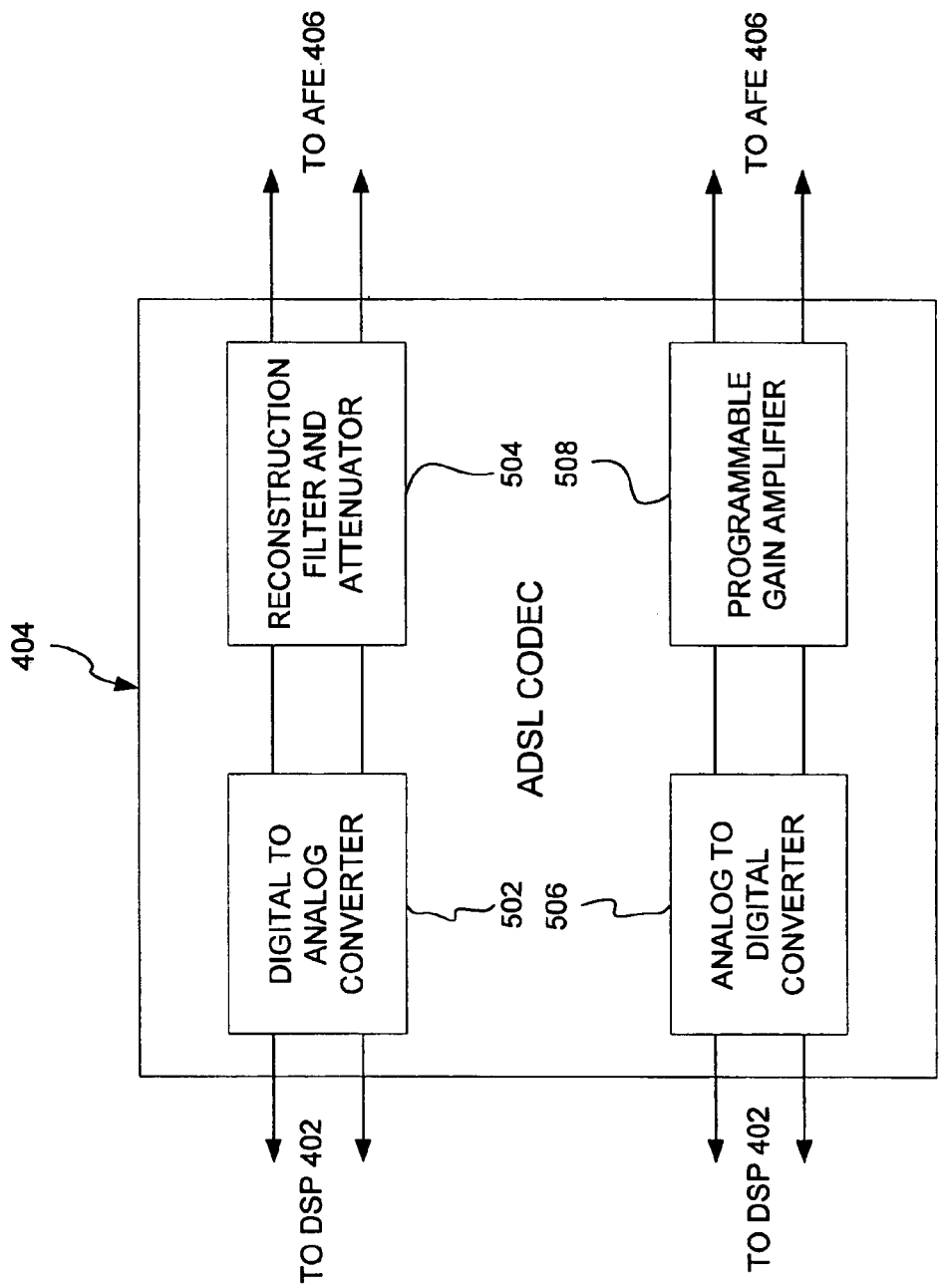
FIG. 5 is a block diagram of the ADSL codec illustrated in FIG. 4.

FIG. 5 illustrates details of the ADSL codec 404 depicted in FIG. 4. The ADSL codec 404 includes a digital to analog converter 502 coupled to a reconstruction filter and attenuator 504 for converting the DSP output to an analog signal and reconstructing the same. Additionally, the ADSL codec 404 includes an analog to digital signal converter 506 and a programmable gain amplifier 508 for converting to digital format the signals received by the ADSL codec 404 from the Analog Front End (AFE) 406. Accordingly, in this configuration, the ADSL codec 404 provides A/D and D/A signal conversions between the DSP 402 and the analog front end (AFE) 406.

Figure 6:
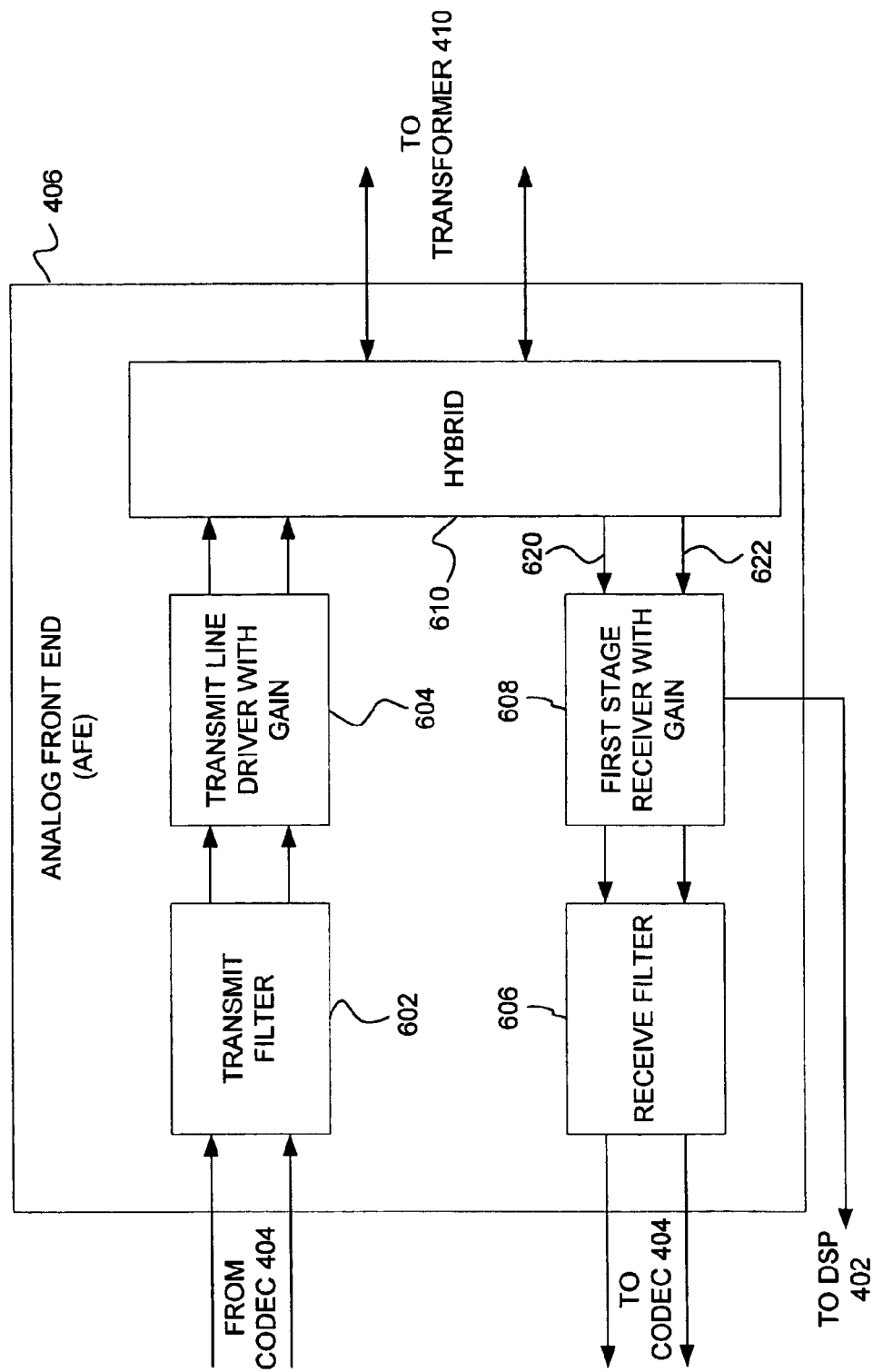
FIG. 6 is a block diagram of the Analog Front End (AFE) of FIG. 4.

FIG. 6 illustrates details of the Analog Front End (AFE) 406 of FIG. 4. As shown, the AFE 406 is interposed between the transformer 410 and the ADSL codec 404 and includes an ADSL transmitter filter 602, an ADSL transmit line driver with gain 604, an ADSL receive filter 606, and a first stage ADSL differential receiver 608. A hybrid 610 interfaces the transformer 410 with the transmit line driver 604 and the first stage receiver 608. The hybrid 610 is a conventional device that converts a two wire line into a four wire line.

The transmit filter 602 is illustrated as coupling the codec 404 with the transmit line driver 604 and is preferably a low pass filter. The ADSL receiver filter 606 advantageously comprises a band-pass filter for echo suppression and anti-aliasing and couples the first stage receiver 608 with the codec 404. Those skilled in the art will appreciate that the transmit and receive filters 602 and 606 may comprise active or passive filters.

The first stage receiver 608 is disposed between the hybrid 610 and the receive filter 606. One purpose of the first stage receiver is to amplify, and thus improve the resolution of, the downstream ADSL signals. As discussed above, however, in some instances the downstream signal is already strong and will tend to saturate the first stage receiver 608 if the receiver 608 amplifies the downstream signal in the same manner in which the receiver 608 amplifies highly attenuated downstream signals. For example, where the loop length is less than about 6,000 feet, the ADSL signal strength, or amplitude, may be relatively high and, therefore, amplifying the downstream signal may saturate the first stage receiver 608 and impair the data transfer rate or prevent an ADSL connection altogether.

As discussed in more detail below, the present first stage receiver 608 addresses the problem of having a strong downstream signal by detecting the strength of the downstream ADSL signal and adjusting the analog front end 406 according to the detected strength. This adjustment may comprise decreasing the gain of the first stage receiver, switching in additional impedance in response to detecting a strong downstream signal, or both. Advantageously, the DSP 402 detects the strength of the downstream ADSL signal and adjusts the gain of the first stage receiver 608 or adjusts the line impedance accordingly.

Figure 7:
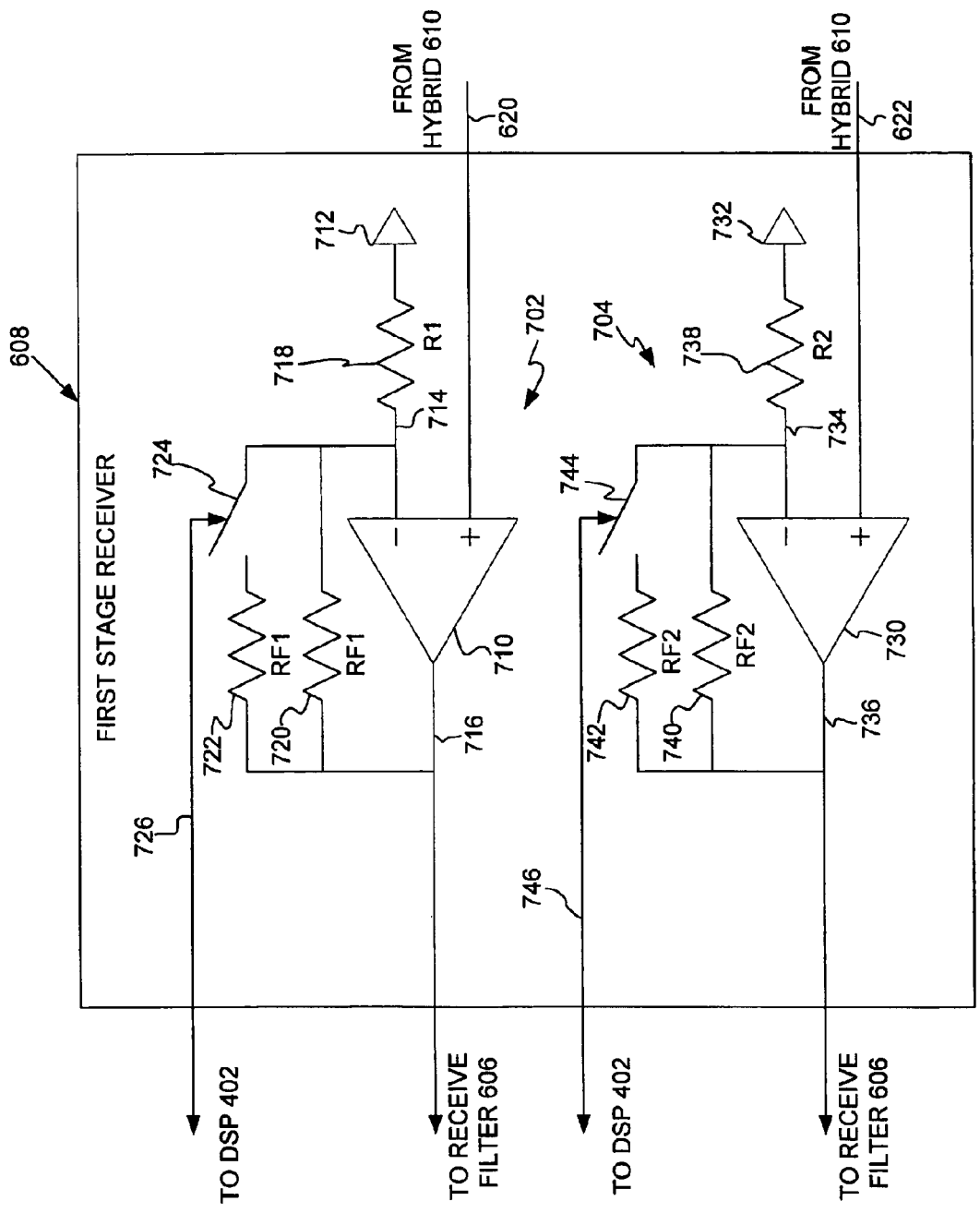
FIG. 7 illustrates details of the first stage receiver of FIG. 6.

FIG. 7 illustrates one embodiment of the present first stage receiver 608. As shown, the first stage receiver 608 includes first and second amplifier circuits 702 and 704, one for each of the differential lines 620 and 622 from the hybrid 610. The first amplifier circuit 702 includes an operational amplifier 710 that is coupled to the line 620 at one input and is coupled to ground 712 along line 714 and resistor 718 having a resistance R1 at the other input. An output line 716 is also coupled to the operational amplifier 710 at its output terminal. Further, a resistor 720 having resistance RF1 is disposed between the input line 714 and the output line 716. An additional resistor 722 also having a resistance RF1 is disposed between the input line 714 and the output line 716 in parallel with the resistor 720. The resistors R1 and RF1 advantageously each have a resistance in the range of about 100–10,000 ohms.

Importantly, the resistor 722 may be selectively switched into and out of the circuit 702 by the switching device 724. Those skilled in the art will appreciate that the switching device 724 may comprise a device such as a switch or a multiplexer. As illustrated, the switching device 724 is controlled along line 726 by the DSP 402 (FIG. 4) to adaptively adjust the gain of the first stage receiver 608 according to the detected strength of the downstream ADSL signal.

In this configuration, when the switching device 724 is in an open position (as shown in FIG. 7), the resistor 722 is switched out of the circuit 702 and, therefore, the gain of the circuit is equal to the ratio of the resistances RF1 and RF or, Gain=RF1/R1. According to this embodiment, this is the default position with the circuit 702 being configured for maximum gain.

However, when the DSP 402 detects a strong downstream signal, the DSP 402 closes the switching device 724 to switch the resistor 722 into the circuit 702. Consequently, when the resistor 722 is switched into the circuit 702, the gain of the circuit 702 is reduced by a factor of two since the resistors 720 and 722 have equal resistances. Hence, with the switching device 724 closed and the resistor 722 switched into the circuit 702 as shown, the gain of the circuit is one half of the ratio of the resistances RF1 and R1 or, Gain=RF1/2*R1. Thus, in this embodiment, the gain of the circuit 702 may be reduced by a factor of two, or, in other words cut in half, by switching in the resistor 722.

The circuit 704 is configured substantially identically to the circuit 702. The second amplifier circuit 704 includes an operational amplifier 730 that is coupled to the line 622 at one input and is coupled to ground 732 along line 734 at the other input. An output line 736 is also coupled to the operational amplifier 730 at its output terminal and includes a resistor 738 having resistance R2 disposed along the line 736. Further, a resistor 740 having resistance RF2 is disposed between the input line 734 and the output line 736. An additional resistor 742 also having a resistance RF2 is disposed between the input line 734 and the output line 736 in parallel with the resistor 740.

Importantly, the resistor 742 may be selectively switched into and out of the circuit 704 by the switching device 744. Those skilled in the art will appreciate that the switching device 744 may comprise a device such as a switch or a multiplexer. As illustrated, the switching device 744 is controlled along line 746 by the DSP 402 (FIG. 4) to adaptively adjust the gain of the first stage receiver 608 according to the detected strength of the downstream ADSL signal.

In this configuration, when the switching device 744 is in an open position (as shown in FIG. 7), the resistor 742 is switched out of the circuit 704 and, therefore, the gain of the circuit is equal to the ratio of the resistances RF2 and R2 or, Gain=RF2/R2. According to this embodiment, this is the default position with the circuit 704 being configured for maximum gain.

However, when the DSP 402 detects a strong downstream signal, the DSP 402 closes the switching device 744 to switch the resistor 742 into the circuit 704. Consequently, when the resistor 742 is switched into the circuit 704, the gain of the circuit 704 is reduced by a factor of two since the resistors 740 and 742 have equal resistances. Hence, with the switching device 744 closed and the resistor 742 switched into the circuit 704 as shown, the gain of the circuit is one half of the ratio of the resistances RF2 and R2 or, Gain=RF2/2*R2. Thus, in this embodiment, the gain of the circuit 704 may be reduced by a factor of two, or, in other words cut in half, by switching in the resistor 742. Those skilled in the art will appreciate that the gain may be adjusted by a different amount where the resistors 720 and 722 and the resistors 740 and 742 have different resistances.

Pursuant to this embodiment, therefore, the DSP 402 in accordance with the strength, or amplitude, of a detected downstream ADSL signal, may adaptively adjust the gain of the first stage amplifier. Thus, in instances where the downstream ADSL signal is strong as it enters the ADSL modem 132, the strong downstream signal is detected by the DSP 402 (FIG. 4), which then switches in the resistors 722 and 742 by activating the switches 724 and 744 to decrease the gain of the first stage receiver 608.

Figure 8:
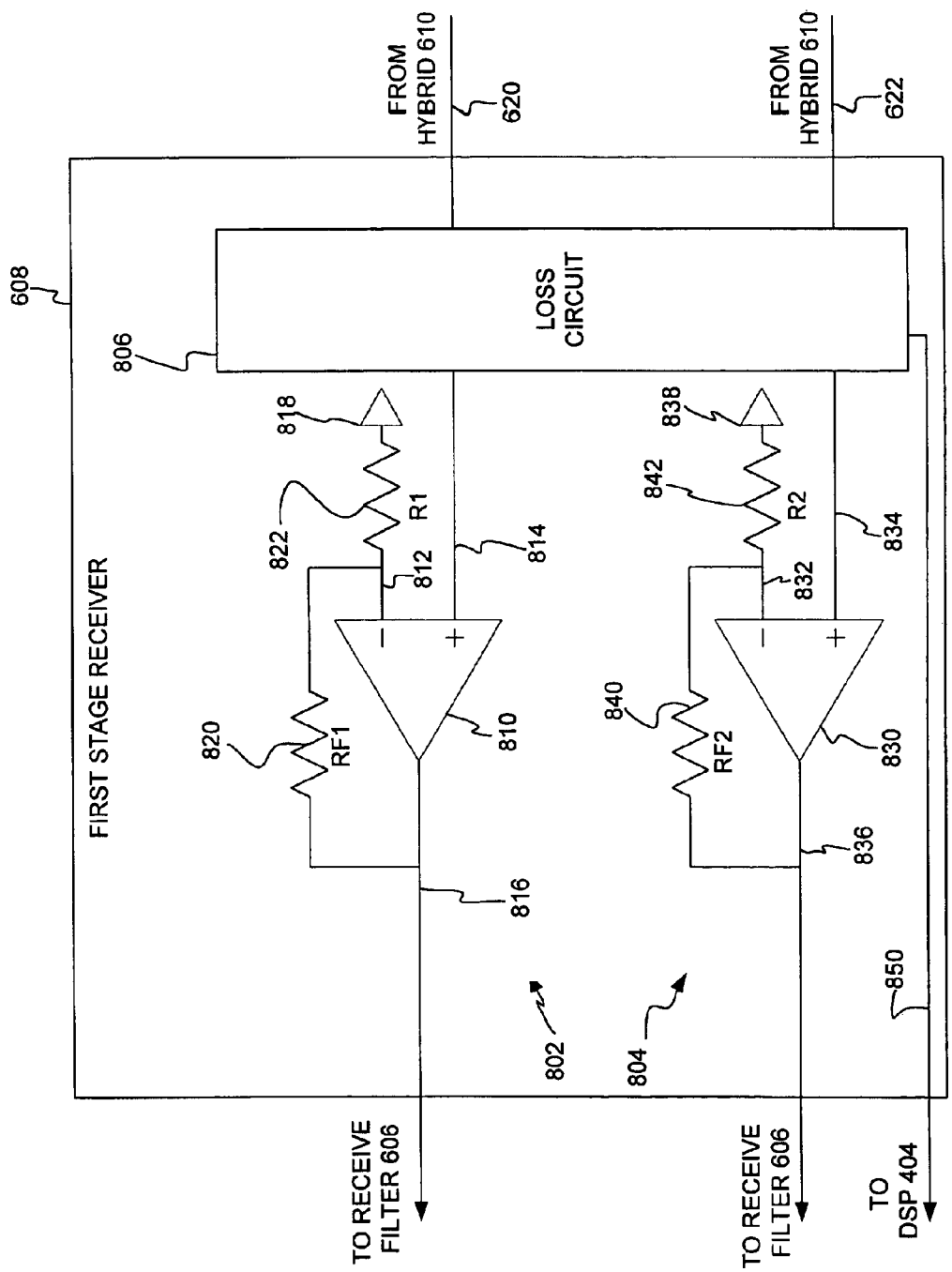
FIG. 8 illustrates details of another embodiment of the first stage receiver of FIG. 6.

FIG. 8 illustrates another embodiment of the present first stage receiver 608. In this embodiment, the first stage receiver 608 comprises first and second operational amplifier circuits 802 and 804 as well as a loss circuit 806. The loss circuit 806 introduces attenuation and attenuates the downstream ADSL signal before the downstream ADSL signal enters into the operational amplifier circuits 802 and 804. Accordingly, in this embodiment, rather than adjusting the gain of the operational amplifier circuits 802 and 804, the loss circuit 806 attenuates the downstream ADSL signal when the DSP 402 detects that the downstream ADSL signal is too strong.

Specifically, the operational amplifier circuit 802 includes an operational amplifier 810 having input lines 812 and 814 and an output line 816. The input line 812 is coupled to ground 818 and the input line 814 is coupled to the line 620 via the loss circuit 806 as discussed below. A resistor 820 having resistance RF1 is disposed between the output line 816 and the input line 812. Moreover, another resistor 822 having resistance R1 is positioned along the line 812.

Similarly, the operational amplifier circuit 804 includes an operational amplifier 830 having input lines 832 and 834 and an output line 836. The input line 832 is coupled to ground 838 and the input line 834 is coupled to the line 622 via the loss circuit 806 as discussed below. A resistor 840 having resistance RF2 is disposed between the output line 836 and the input line 832. Moreover, another resistor 842 having resistance R2 is positioned along the line 832.

In this configuration, the operational amplifier circuits 802 and 804 have nonadjustable, fixed gains. The loss circuit 806 is controlled by the DSP 402 along the line 850 to adaptively introduce attenuation and attenuate the downstream ADSL signal before the downstream ADSL signal enters the amplifier circuits 802 and 804 when the DSP 402 detects a strong ADSL downstream signal. The loss circuit 806 is described in more detail below with reference to FIG. 9. The resistors RF1, R1, RF2, and R2 advantageously each have a resistance in the range of about 100–10,000 ohms.

Figure 9:
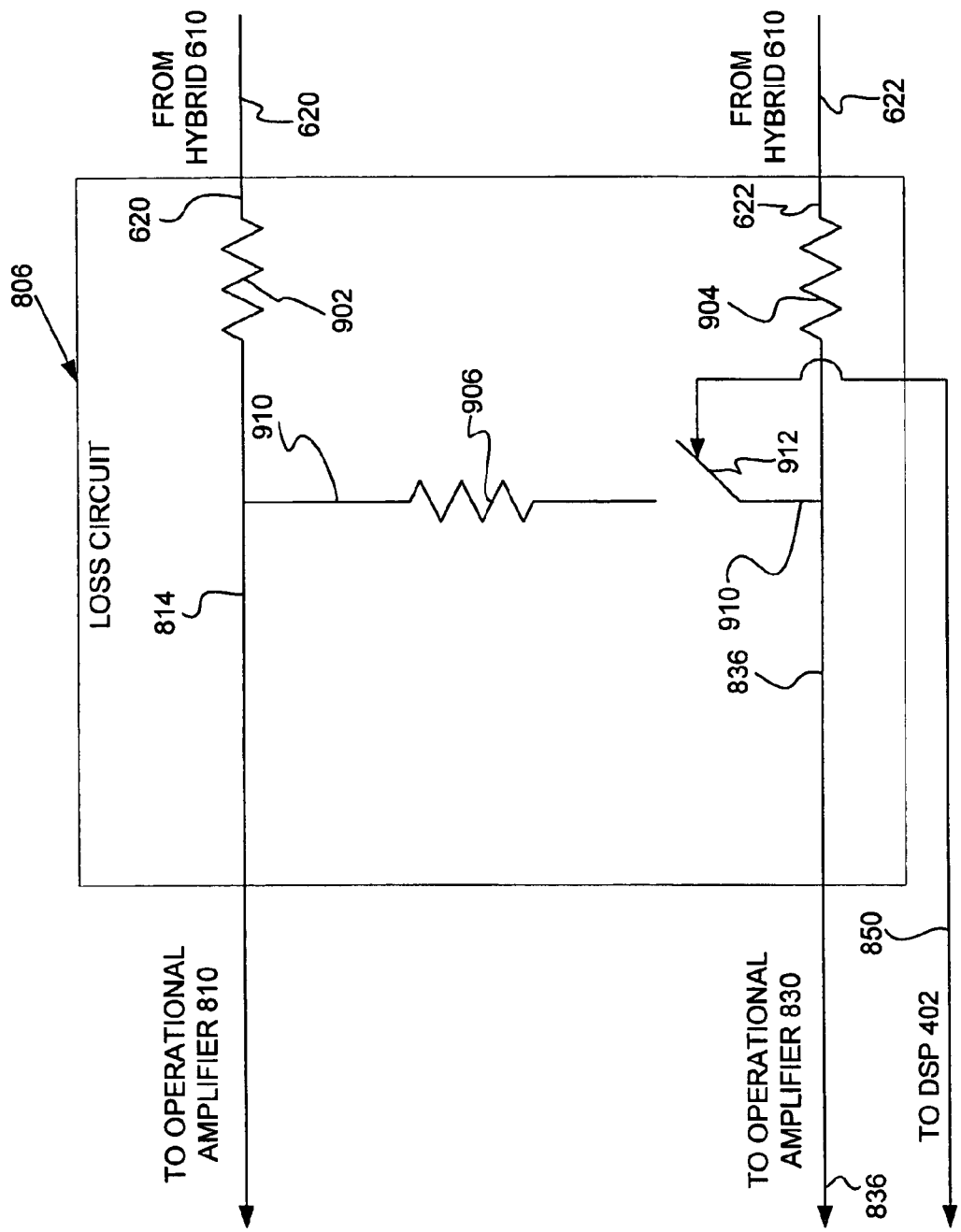
FIG. 9 illustrates details of the loss circuit of FIG. 8.

FIG. 9 illustrates details of the loss circuit 806. As shown, the loss circuit 806 is disposed between the hybrid 610 and the operational amplifiers 810 and 830 and includes resistors 902, 904, and 906. The resistor 902 is disposed along the line 620 and the resistor 904 is disposed along the line 622. Advantageously, the resistors 902 and 904 each have a resistance in the range of about 100–100,000 ohms and, in one embodiment, comprise 2,000-ohm resistors.

The resistor 906 is positioned along line 910, which selectively interconnects the lines 814 and 836. Advantageously, the resistor 906 has a resistance in the range of about 100–10,000 ohms and, in one embodiment, comprises a 4,000-ohm resistor. The line 910 also includes a switching device 912 for selectively interconnecting the lines 814 and 836 through the resistor 906. The switching device 912 is controlled by the DSP 402 along line 850 and may comprise, for example, a switch, a relay, or a multiplexer.

Accordingly, when the DSP 402 detects that the downstream ADSL signal is strong, or above a predetermined threshold, the DSP 402 closes the switching device 912 to switch in the resistor 906 to attenuate the downstream ADSL signal before it enters the operational amplifiers 810 and 830. One advantage associated with the embodiment of FIG. 9 is that it might be more accurate than the embodiment of FIG. 7 in some applications because the gain of the operational amplifier circuits 802 and 804 need not be adjusted. Moreover, those skilled in the art will appreciate that the loss circuit 806 may be disposed within the first stage receiver 608 or outside of the first stage receiver 608 between the receiver 608 and the hybrid 610.

Figure 10:
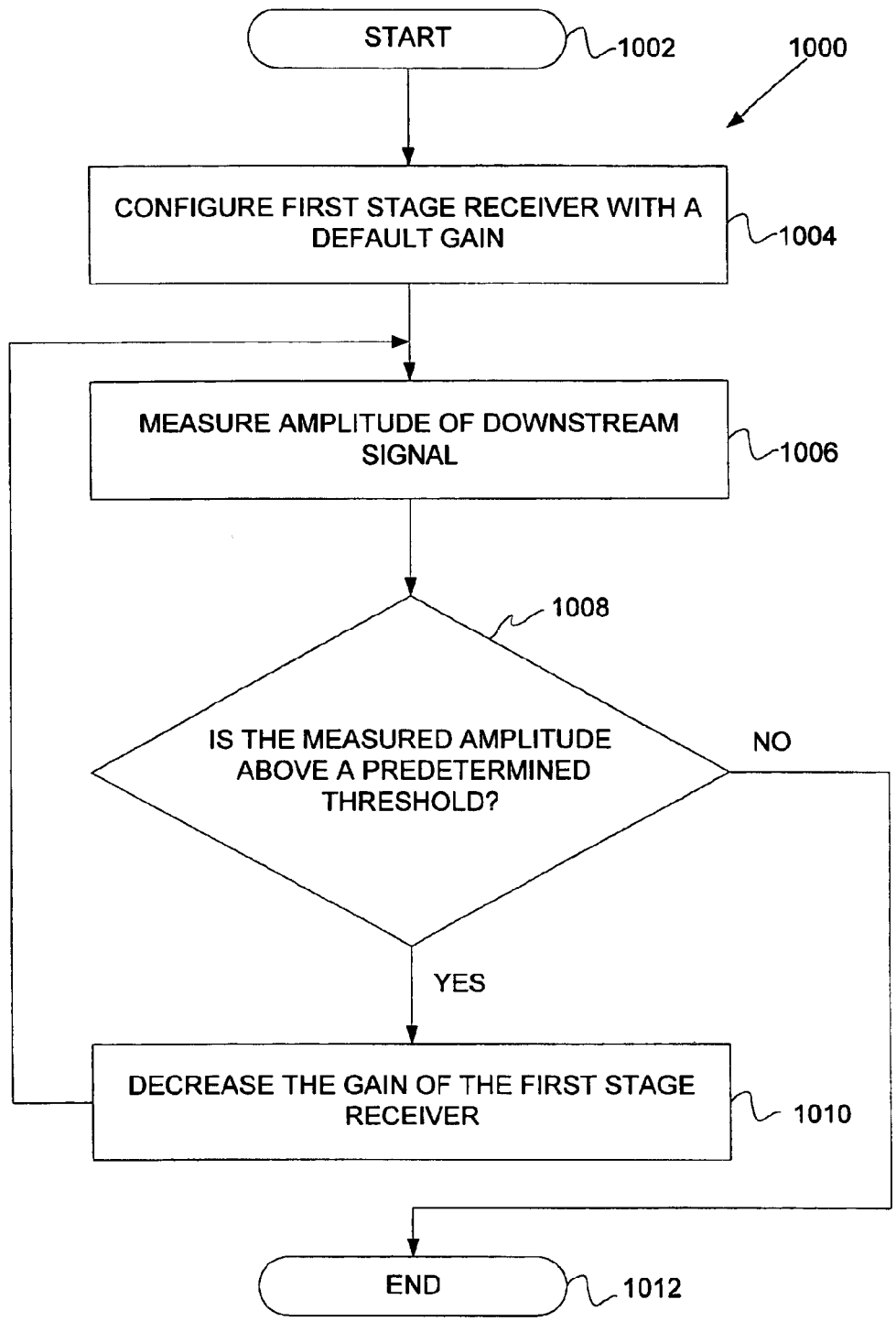
FIG. 10 is a flowchart illustrating one embodiment of the present method.

FIG. 10 is a flowchart 1000 illustrating one embodiment of a method for adaptively adjusting the gain of an ADSL modem first stage receiver. The method starts in block 1002. Next, the first stage receiver 608, such as that shown in FIG. 7, is configured with a default gain pursuant to block 1004. Advantageously, the default gain is a relatively high and appropriate for use with loop lengths ranging from about 6,000 feet to about 14,000 feet. With reference to the first stage receiver 608 illustrated in FIG. 7, the default configuration is achieved by opening the switching devices 724 and 744 so as to switch out the resistors 722 and 742. In the embodiment shown in FIG. 7, the DSP 402 controls the switching devices 724 and 744.

As shown in block 1006, the next step is measuring the amplitude of the downstream signal. Preferably, the DSP 402 measures the amplitude of the downstream ADSL signal using conventional algorithms to determine the amplitude, or strength of the downstream ADSL signal. The DSP 402 may measure the amplitude of the downstream ADSL signal by probing the downstream signal.

The next step is to determine whether the measured amplitude of the downstream ADSL signal is above a predetermined threshold, pursuant to block 1008. The DSP 402 preferably performs this determination. The predetermined threshold may be the maximum downstream signal amplitude the first stage receiver 608 (FIG. 7) can receive without becoming saturated or causing an unacceptable noise level. If the measured amplitude of the downstream ADSL signal is above the predetermined threshold, then the determination of block 1008 is "yes" and execution proceeds to block 1010. Alternatively, if the measured amplitude of the downstream ADSL signal is not above the predetermined threshold, then the determination of block 1008 is "no" and execution proceeds to block 1012, where the process ends.

As mentioned above, if the measured downstream ADSL signal is above the predetermined threshold, execution proceeds to block 1010, which represents the step of decreasing the gain of the first stage receiver 608 (FIG. 7). The DSP 402 adaptively decreases the gain of the first stage receiver 608 in response to detecting a high amplitude downstream ADSL signal by driving the switching devices 724 and 744 (FIG. 7) to switch in the resistors 722 and 742. When the resistors 722 and 742 are switched in, the gain of the first stage receiver 608 is approximately one half of the gain of the first stage receiver 608 with the resistors 722 and 742 switched out. After decreasing the gain of the first stage receiver 608 pursuant to block 1010, execution returns to block 1006. Accordingly, in this manner, the first stage receiver 608 of an ADSL modem 132 (FIG. 1) can function effectively in short loop conditions where the downstream ADSL signal may be relatively strong.

Figure 11:
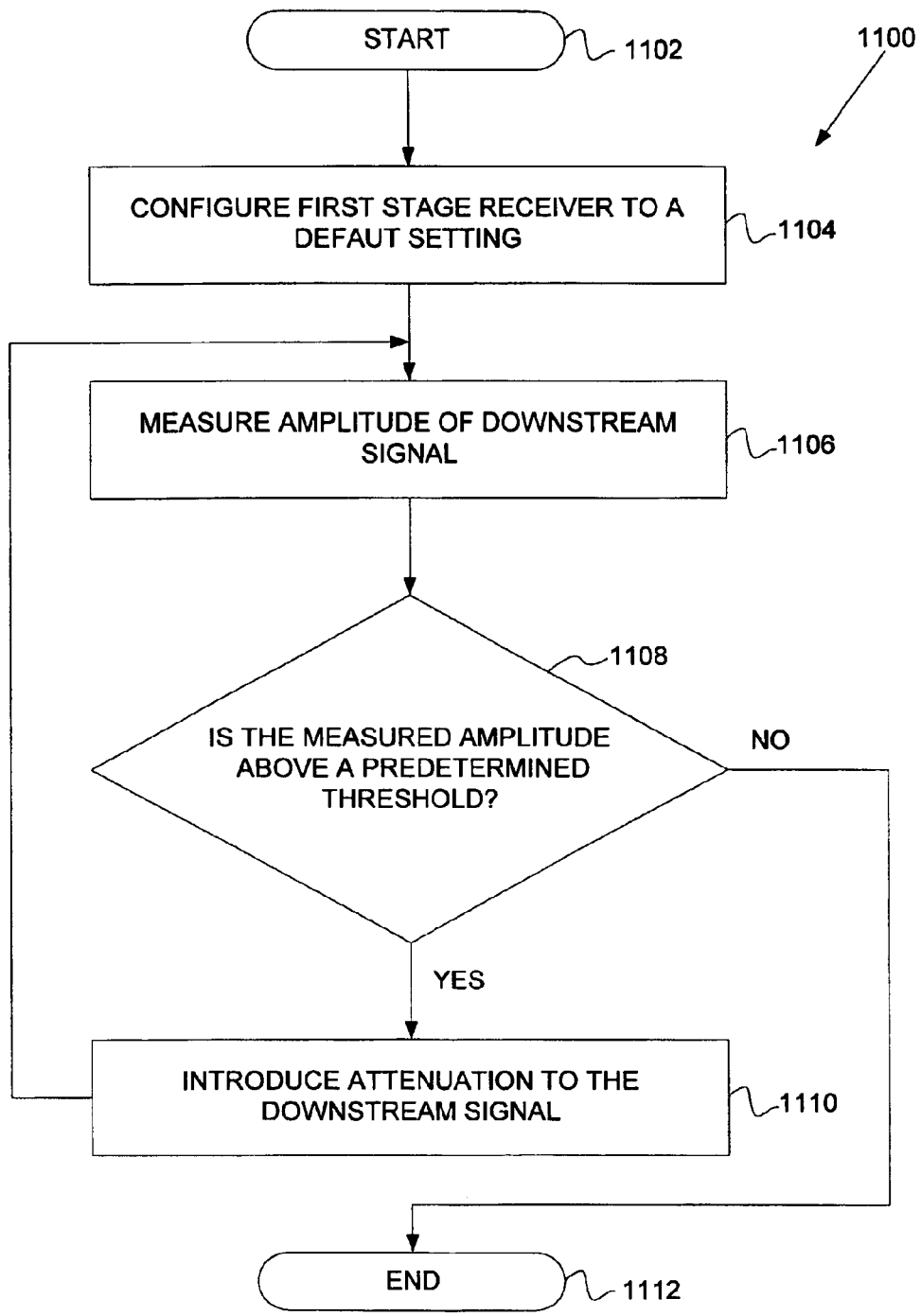
FIG. 11 is a flowchart illustrating another embodiment of the present method.

FIG. 11 is a flowchart 1100 that illustrates another embodiment of a method for adjusting an ADSL modem first stage receiver in response to a high amplitude downstream ADSL signal. The method starts in block 1102. Next, the first stage receiver 608, such as that shown in FIG. 8 is configured with a default impedance pursuant to block 1004. FIG. 9 illustrates that the default impedance of the loss circuit 806 (FIG. 8) may comprise the resistors 902 and 904, which are disposed along the input lines 816 and 836. Under normal loop conditions (i.e. loop lengths greater than about 6,000 feet) the only impedance added to the downstream ADSL signal by the loss circuit 806 is that imparted by the resistors 902 and 904.

As shown in block 1106, the next step is measuring the amplitude of the downstream signal. Preferably, the DSP 402 measures the amplitude of the downstream ADSL signal using conventional algorithms to determine the amplitude, or strength of the downstream ADSL signal. The DSP 402 may measure the amplitude of the downstream ADSL signal by probing the downstream signal.

The next step is to determine whether the measured amplitude of the downstream ADSL signal is above a predetermined threshold, pursuant to block 1108. This determination is preferably performed by the DSP 402. The predetermined threshold may be the maximum downstream signal amplitude the first stage receiver 608 (FIG. 7) can receive without becoming saturated or causing an unacceptable noise level. If the measured amplitude of the downstream ADSL signal is above the predetermined threshold, then the determination of block 1108 is "yes" and execution proceeds to block 1110. Alternatively, if the measured amplitude of the downstream ADSL signal is not above the predetermined threshold, then the determination of block 1108 is "no" and execution proceeds to block 1112, where the process ends.

As mentioned above, if the measured downstream ADSL signal is above the predetermined threshold, execution proceeds to block 1010, which represents the step of introducing additional impedance to attenuate the downstream signal. The DSP 402 adaptively adds impedance to the downstream ADSL signal in response to detecting a high amplitude downstream ADSL signal by driving the switching device 912 (FIG. 9) to switch in the resistor 906. When the resistor 906 is switched in, the loss circuit 806 introduces approximately a 6 dB decrease in the amplitude, or strength, of the downstream ADSL signal so that the downstream signal does not saturate the first stage receiver 608. After introducing the additional impedance pursuant to block 1110, execution returns to block 1106. Accordingly, in this manner, the first stage receiver 608 of an ADSL modem 132 (FIG. 1) can function effectively in short loop conditions where the downstream ADSL signal may be relatively strong.

The invention has been described above with reference to specific embodiments. It will, however, be evident that various modifications and changes may be made thereto without departing from the broader spirit and scope of the invention as set forth in the appended claims. The foregoing description and drawings are, accordingly, to be regarded in an illustrative rather than a restrictive sense.

What is claimed is:

1. An automatically adjustable DSL modem for adaptively accommodating a high amplitude downstream DSL signal, comprising:

a data processor for determining an amplitude of the downstream DSL signal; and a first stage receiver coupled to and controlled by the data processor;

the first stage receiver comprising:

an adjustable gain so that the data processor may decrease the gain of the first stage receiver in response to detecting a high amplitude downstream DSL signal; and a pair of amplifier circuits, each amplifier circuit including a switching device coupled to and controlled by the data processor for selectively switching in additional resistance to decrease the gain of the amplifier circuit in response to detection of a high amplitude downstream DSL signal.

2. The automatically adjustable DSL modem according to claim 1, further comprising an analog front end including a hybrid and a receive filter, the first stage receiver being disposed between the hybrid and the receive filter.

3. An automatically adjustable DSL modem for adaptively accommodating a high amplitude downstream DSL signal, comprising:

a data processor for determining an amplitude of the downstream DSL signal; and a loss circuit coupled to and controlled by the data processor for attenuating the downstream signal in response to the data processor determining that a high amplitude downstream DSL signal is present, wherein the loss circuit further comprises a switching device coupled to a resistor, the switching device being coupled to and controlled by the data processor to switch in the resistor to selectively attenuate the downstream DSL signal.

4. A DSL modem for converting a downstream DSL analog signal to digital data and for converting digital data to an analog signal, comprising:

a data processor for detecting the amplitude of the downstream analog signal, the data processor being configured to determine whether the amplitude of the downstream analog signal is greater than a predetermined threshold;

an analog front end coupled to and controlled by the data processor for receiving the downstream analog signals;

the date processor being configured to adjust the analog front end according to whether the amplitude of the downstream signal is greater than a predetermined threshold to prevent the analog front end from being saturated by high amplitude downstream signals; and a passive loss circuit coupled to and controlled by the data processor for attenuating the downstream signal in response to the data processor detecting a downstream signal greater than the predetermined threshold.

\* \* \* \* \*